April 4, 1950           C. W. INGELS           2,502,727
THERMAL ALARM
Filed Sept. 8, 1948
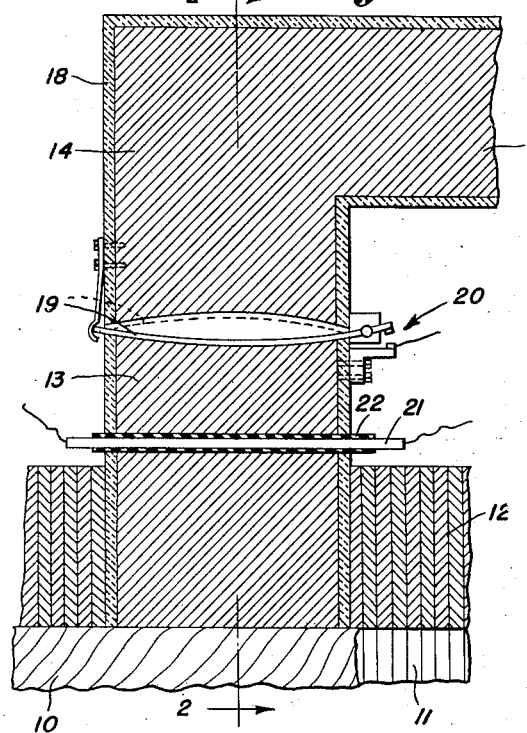
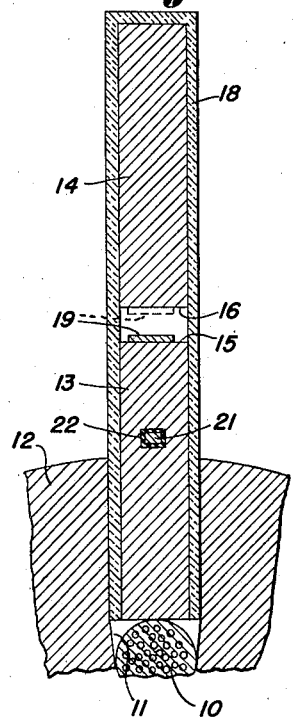
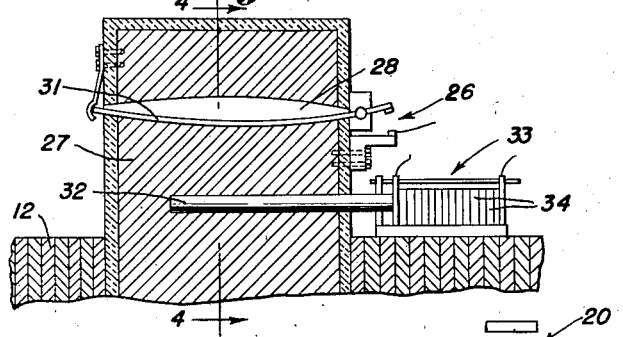
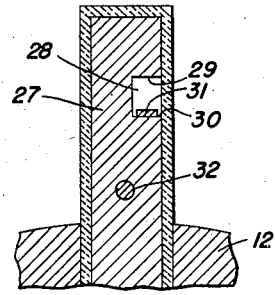
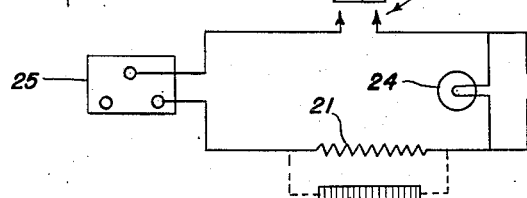
Inventor
CLARENCE W. INGELS
Attorney Patented Apr. 4, 1950

2,502,727

UNITED STATES PATENT OFFICE 2,502,727

THERMAL ALARM

Clarence W. Ingels, St. Albans, N. Y.

Application September 8, 1948, Serial No. 48,229

8 Claims. (Cl. 177—311)

This invention relates to protective systems for electric equipment and more particularly to signalling means for indicating when the temperature of an electrical translating device is approaching a critical or dangerous value that may damage the device. The signalling means provided by this invention not only indicates when the equipment temperature has reached a predetermined value, somewhat lower than the critical value, but also indicates temperature changes above the predetermined temperature.

Reference is made to my copending application Serial No. 671,885, now United States Patent No. 2,455,011, for a recital of the advantages of such a signalling system. This application is a continuation-in-part of the aforesaid application. The thermally responsive apparatus described and claimed in the aforementioned patent and the thermally responsive apparatus described and claimed in my copending application Serial No. 48,230, produce intermittent signals which operate at a frequency that is a function of temperature. The thermally responsive apparatus provided by this invention produces a signal which operates at an intensity that is a function of temperature. By combining the apparatus provided by this invention with apparatus of the type disclosed in the aforementioned applications, temperature changes are even more effectively indicated by the unique signal so obtained. Not only is such a signal intermittently operated at a frequency which is a function of temperature, but also at an intensity which is a function of temperature. Thus, the operator of an electric motor or generator may have two simultaneous indications of temperature variations.

Accordingly, it is an object of this invention to provide novel signalling means for indicating when the temperature of an electrical translating device is at or above a predetermined temperature, lower than the critical temperature thereof, and temperature changes above the predetermined temperature.

It is another object of this invention to provide means for producing a dually variable signal for indicating temperature changes of an electrical translating device above a predetermined temperature.

Other objects and advantages of the invention will be apparent from the following description and accompanying drawings in which:

Figure 1 is a fragmentary sectional view showing the application of signal control means embodying this invention to an electrical translating device.

Figure 2 is a fragmentary sectional view taken on line 2—2 of Figure 1.

Figure 3 is a fragmentary sectional view similar to Figure 1 showing a modification of the signal control means of this invention.

Figure 4 is a fragmentary sectional view taken on line 4—4 of Figure 3.

Figure 5 is a wiring diagram illustrating an electric circuit embodying this invention.

Referring first to Figures 1 and 2, there is shown a portion of the stator of a conventional three phase electric induction motor. Stator windings 10 are mounted in the usual slots 11 provided in the inner side of an annular laminated core 12. The current flowing through the stator windings 10 develops considerable heat which is fairly rapidly dissipated from the ends (not shown) of the windings which are exposed to the usual stream of cooling air. That portion of the windings, however, which is embedded in the core slots 11 more nearly reflects the absolute temperature of the windings and is not affected by ambient temperature variations. Accordingly, it is preferred to mount the temperature sensitive elements of this invention in such a manner that such elements are directly responsive to the temperature of the embedded portions of the windings.

Inserted in a suitable opening or slot formed in the laminated core 12 and projecting a short distance above the outer surface thereof is a heating member 13 formed of material having high heat conductivity, such as copper. The heating member 13 extends into the core 12 to the bottom of one of the slots 11, as shown, into good heat exchange contact with the insulated surface of the windings 10. Hence the heating member 13 not only rapidly follows temperature variations of the windings, but also maintains substantially the same temperature as the windings.

Mounted above the heating member 13 is a heat dissipating or cooling member 14, also formed of material having high heat conductivity. The members 13 and 14 have concavely curved juxtaposed faces 15 and 16, respectively, spaced a short distance apart. A portion 17 of the cooling member 14 extends axially of the motor and has an end portion (not shown) projecting into the path of the cooling air for the motor. This construction of the cooling member is well illustrated, and an alternative construction described, in the aforementioned application Serial No. 671,885, to which reference is made for a detailed description. Both members 13 and 14 are enclosed in a sheath 18 of heat insulating material except for the remotely positioned ends thereof.

From the construction thus far described, it will be seen that the projecting end of the heating member 13 attains substantially the same temperature as that of the embedded portion of the windings 10. This result obtains both because the heating member has high heat conductivity and because the heat insulating sheath 18 prevents the upper end of the heating member from losing heat. Similarly the inner end of the cooling member 14 attains substantially the same temperature as the outer end thereof which is positioned in a cooling air stream. Hence, the face 16 of the cooling member remains at a temperature substantially lower than that of the face 15 of the heating member, when the motor is running.

Mounted between the oppositely curved opposed faces 15 and 16 of the members is a snap-acting bimetallic thermostatic strip 19 having a projecting portion which operates an electric switch, generally indicated at 20. This strip 19 is responsive to a predetermined temperature and at temperatures therebelow the strip is in direct heat exchange relation with the face 15 of the heating member and the switch 20 is open. When the temperature of the strip is raised to the predetermined temperature, the strip snaps into an actuated position, shown in dotted lines in Figures 1 and 2, in direct heat exchange relation with the face 16 of the cooling member, thus closing the switch 20. The thermally responsive mechanism thus far described, as well as modifications thereof, for operating the switch 20, are disclosed in detail in the previously mentioned Patent No. 2,455,011, to which reference is again made for a fuller understanding. Suffice it to say that when the temperature of the windings is at or above the predetermined temperature, the thermally responsive mechanism intermittently operates the switch 20 at a frequency which is a function of the temperature of the windings. Another thermally responsive mechanism for accomplishing intermittent switch operation at thermally variable frequencies, which operates on somewhat different principles, is described and claimed in my copending application Serial No. 48,230. Either type of mechanism may be utilized to accomplish intermittent operation of the switch 20 at frequencies which vary with temperature variations.

Embedded in the heating member 13 is a resistance element or rod 21 having the ends thereof projecting outwardly on opposite sides of the heating member. The rod 21 is electrically insulated from the heating member by a sheath or coating 22. This sheath 22 is preferably thin and made of material having poor heat insulating qualities, so that the rod 21 is in good heat exchange relation with the heating member. Hence, the temperature of the rod rapidly follows, and maintains substantially the same temperature as, that of the heating member 13. The rod is formed of an electrically conducting material having an electrical resistance which rapidly varies with temperature variations. Preferably such material has a negative temperature coefficient of electrical resistance, so that the resistance of the rod 21 decreases upon temperature increases in the operating temperature range, i. e. above the previously mentioned predetermined temperature. A material having such a temperature-resistance relationship is a copper-manganese-nickel alloy, known as "Manganin." Another such material is carbon. The reason for this preferred type of resistance-temperature relation is described later. The rod also may be made of a material having a large positive temperature coefficient of electrical resistance, such as iron or nickel. In this case, the resistance of the rod increases upon temperature increases.

The signalling apparatus, controlled by the above described thermally responsive switch mechanism and embedded resistance rod, is shown diagrammatically in the wiring diagram of Figure 5. The signalling device may be either audible or visual, or both. Both are shown for purposes of illustration. Numerous types of audible signalling devices are suitable. An electrically actuated siren 23 is illustrated, but an electrically actuated buzzer or bell, or an electrically controlled pneumatic horn will perform the audible signalling function as well. The visual signalling device is shown as an electric lamp 24, but it is obvious that other types of visual signalling devices, such as an oscillating arm, will also perform the visual signalling function. Furthermore, although the audible and visual signalling devices illustrated are operated directly by the current flowing in the circuit, it is obvious that the circuit may be adapted to operate relays or electronic type amplifiers which provide energy for controlling and/or operating the signalling devices.

The siren 23 and lamp 24 are connected in parallel to a suitable source of electric power and the switch 20 and resistance rod 21 are connected in series in the power lines. The power may be taken directly from the terminal board 25 of the motor, using only two of the three terminals, as shown, or an independent source of electric energy, such as a battery, not shown, may be used.

The operation of the signalling devices is as follows: if the temperature of the windings of the motor reaches the predetermined temperature, below the critical temperature, the lamp 24 is lighted intermittently and the siren 23 is sounded intermittently. If the temperature of the windings increases above the predetermined temperature, the frequency of operation of the switch 20 increases, thereby increasing the frequency of the signals, i. e. the intervals of "dead" time between the successive lightings of the lamp and the successive soundings of the siren will decrease. The converse is true when the temperature of the windings decreases. Thus, variations of signal frequency indicate temperature changes. The advantages of such an indication to the operator of an electric motor or generator are given in detail in the aforementioned application Serial No. 671,885 to which reference again is made.

An increase in winding temperature above the predetermined signal-initiating temperature provides another change in the character of the signals in addition to the frequency change described above. Because the resistance rod 21 is connected into the signal operating circuit, temperature changes of the windings produce corresponding changes in the current flowing in the circuit. Accordingly, if the rod 21 has a negative temperature coefficient of resistance in the operating temperature range, increased temperatures of the rod increase the intensity of the signals, i. e. the brightness of the lamp and the sound produced by the siren. The sound produced by the latter also will normally increase in pitch. Such pitch changes are readily identified because of the intermittent operation of the siren. A decrease in temperature causes corresponding decreases in signal intensity. Thus, the operator is provided with signals having an intensity indication of temperature changes in addition to the frequency indication. If the rod 21 has a positive coefficient of resistance, temperature increases reduce signal intensity. This type of indication is not preferred, however, because an increasing signal intensity is psychologically a better indication of increasing temperature.

The invention also contemplates the use of thermally responsive means for providing a variable intensity signal in combination with thermally responsive means for effecting either intermittent operation of the signal at a constant frequency or continuous operation of the signal. Thermally responsive means for effecting continuous operation of a variable intensity signal is shown in Figures 3 and 4. Such means comprises a normally open thermally responsive switch 26 which is closed by a predetermined temperature and which remains in such closed position as long as the temperature is at or above the predetermined temperature. The switch actuating mechanism comprises a heating member 27 sheathed with heat insulating material and associated with the core 12 in a manner similar to the previously described member 13. The member 27 has a relatively narrow recess 28 therein provided with concavely curved opposed walls 29 and 30. A snap-acting bimetallic thermostatic strip 31, similar to the previously described strip 19, is mounted in the recess 28 in heat exchange contact with the wall 30 and adapted to operate the switch 26. The strip 31 is actuated by the previously described predetermined temperature. The switch 26 normally is open, but when the temperature of the windings reaches the predetermined temperature, the strip 31 is actuated, thus closing the switch 26. In the actuated position, the strip 31 maintains direct heat exchange relation with the wall 29 of the recess 28 in the heating member. Hence, the switch 26 remains closed as long as the windings are at or above the predetermined temperature. When the switch 20 shown in the circuit in Figure 5 is replaced by the switch 26, the signals are operated continuously if the temperature of the windings reaches or exceeds the predetermined temperature, and only signal intensity variations provide indications of temperature changes. A detailed description of a thermally responsive switch similar to the switch 26 is given in the aforesaid copending application Serial No. 617,885 to which reference again is made. Although a specific thermally responsive mechanism for operating the switch 26 is illustrated, other thermally responsive switches of conventional types may be substituted for the switch 26. Such other switches should, of course, be positioned to be responsive to the temperature of the windings 10 either directly or indirectly.

Figures 3 and 4 also illustrate a modified form of the thermally responsive means for effecting a variation in signal intensity. A rod or element 32, having a high coefficient of thermal expansion, is embedded in the heating member 27 in direct heat exchange relationship therewith and with one end projecting therefrom. Mounted on the laminated core 12 adjacent the projecting end of the rod 32 is a stack 33 of carbon discs 34. Electric terminals are connected to the ends of the stack 33 which has well known compression-resistance characteristics, i. e. the electrical resistance through the stack decreases with compression of the discs 34. Expansion of the rod 32 upon temperature increase compresses the stack 33, thus lowering the electrical resistance thereof between the end terminals. The stack 33 is adapted to be connected into the circuit illustrated in Figure 5, as a substitute for the previously described resistance rod 21. Such a construction provides the preferred form of signal intensity variation, i. e. intensity increase upon temperature increase.

It is apparent that various modifications of the specific apparatus shown and described may be made while retaining the basic principles of the invention. Furthermore, the invention has applications other than electrical equipment. For example, the invention may be utilized to give temperature indications of a bearing or of any cooling liquid which becomes heated in use. Accordingly, the invention embraces all modifications and embodiments which come within the spirit and scope of the following claims.

I claim:

1. Thermally responsive signalling means for indicating a predetermined temperature and temperature changes above said predetermined temperature comprising: thermally variable electrical resistance means; thermally actuable electric switch means, said switch means being intermittently actuated at temperatures at or above a predetermined temperature; an electric circuit including said resistance means and said switch means connected in series; and signalling means controlled by said circuit, the intensity of the signal produced by said signalling means being a function of the current flowing in said circuit.

2. The structure defined by claim 1 in which the electric resistance means is an elongated element the electrical resistance of which is a function of the temperature thereof.

3. The structure defined by claim 1 in which the electric resistance means comprises an elongated metallic element having a high thermal coefficient of expansion, and a carbon stack secured in fixed relation to said element, one end of said element bearing against one end of said stack, whereby expansion of said element compresses said stack to vary the resistance thereof.

4. Thermally responsive signalling means for indicating a predetermined temperature and temperature changes above said predetermined temperature, comprising: thermally variable electrical resistance means adapted to be positioned in heat exchange relation with heat producing means; thermally actuable electric switch means adapted to be associated with said heat producing means, said switch means being intermittently actuated when said heat producing means is at or above a predetermined temperature; an electric circuit including said resistance means and said switch means connected in series; and signalling means controlled by said circuit, the intensity of the signal produced by said signalling means being a function of the current flowing in said circuit, whereby when said heat producing means is at or above said predetermined temperature said signalling means is intermittently actuated at an intensity which is a function of the temperature of said heat producing means.

5. Thermally responsive signalling means for indicating a predetermined temperature and temperature changes above said predetermined temperature, comprising: a member having high heat conductivity adapted to be positioned in substantially direct heat exchange relation with heat producing means; thermally variable electrical resistance means having a temperature sensitive element in substantially direct heat exchange relation with said member; thermally actuable electric switch means having a temperature-sensitive movable operating element, said element being in switch opening position and in direct heat exchange relation with a portion of said member when the temperature thereof is below said predetermined temperature, and being moved to switch closing position out of direct heat exchange relation with said portion when the temperature thereof is at or above said predetermined temperature; an electric circuit including said resistance means and said switch means connected in series; and signalling means controlled by said circuit, the intensity of the signal produced by said signalling means being a function of the current flowing in said circuit.

6. Thermally responsive signalling means for indicating a predetermined temperature and temperature changes above said predetermined temperature, comprising: a member having high heat conductivity adapted to be positioned in substantially direct heat exchange relation with heat producing means; thermally variable electrical resistance means having a temperature sensitive element in substantially direct heat exchange relation with said member; a cooling member adapted to be maintained at a temperature lower than said predetermined temperature; thermally actuable electric switch means responsive to a predetermined temperature and including a temperature sensitive element having a movable portion adapted in one position of said switch means to be in substantially direct heat exchange relation with said heat conducting member and in the other position of said switch means in substantially direct heat exchange relation with said cooling member, said switch means when said heat producing means is at or above said predetermined temperature being intermittently actuated at a frequency which is a function of the temperature of said heat producing means; an electric circuit including said resistance means and said switch means connected in series; and signalling means controlled by said circuit, the intensity of the signal produced by said signalling means being a function of the current flowing in said circuit.

7. Thermally responsive signalling means for indicating a predetermined temperature and temperature changes above said predetermined temperature, comprising: a member having high heat conductivity adapted to be positioned in substantially direct heat exchange relation with heat producing means; thermally variable electrical resistance means having a temperature sensitive element in substantially direct heat exchange relation with said member; thermally actuable electric switch means responsive to a predetermined temperature and including a temperature sensitive element having a movable portion adapted in both positions of said switch means to be in substantially direct heat exchange relation with said member; an electric circuit including said resistance means and said switch connected in series; and electric signalling means connected into said circuit, the intensity of the signal produced by said signalling means being a function of the current flowing in said circuit, whereby when said heat producing means is at or above said predetermined temperature said signalling means is continuously operated at an intensity which is a function of the temperature of said heat producing means.

8. Thermally responsive signalling means for indicating a predetermined temperature of the windings of an electrical translating device, said temperature being lower than the critical temperature of the windings, and for indicating temperature changes of the windings above said predetermined temperature, said means comprising: a member having high heat conductivity adapted to be positioned in substantially direct heat exchange relation with the windings; thermally variable electric resistance means having a temperature sensitive element in substantially direct heat exchange relation with said member; thermally actuable electric switch means responsive to a predetermined temperature and including a movable temperature sensitive element adapted in switch opening position thereof to be in direct heat exchange relation with a portion of said member and in switch closing position thereof to be out of direct heat exchange relation with said portion of the member; an electric circuit including said resistance means and said switch connected in series; and electric signalling means connected into said circuit, the intensity of the signal produced by said signalling means being a function of the current flowing in said circuit.

CLARENCE W. INGELS.

REFERENCES CITED

The following references are of record in the file of this patent:

UNITED STATES PATENTS

| Number | Name | Date |
|---|---|---|
| 1,224,385 | Kennedy | May 1, 1915 |
| 1,492,022 | Eddy | Apr. 29, 1924 |
| 1,695,295 | Rollins | Dec. 18, 1928 |
| 2,455,011 | Ingels | Nov. 30, 1948 |